(12) United States Patent
Arangarasan et al.

(10) Patent No.: US 11,511,724 B2
(45) Date of Patent: Nov. 29, 2022

(54) SPRING BRAKE ACTUATOR WITH AN INTEGRATED VALVE UNIT

(71) Applicant: WABCO India Limited, Chennai TN (IN)

(72) Inventors: Senthil Kumar Arangarasan, Ayapakkam (IN); Pratheesh Kumar Prem Kumar, PN.Palayam (IN); Aravindda Swamy Venkatesh, Chennai (IN)

(73) Assignee: WABCO India Limited, Chennai TN (IN)

( * ) Notice: Subject to any disclaimer, the term of this patent is extended or adjusted under 35 U.S.C. 154(b) by 29 days.

(21) Appl. No.: 17/038,162

(22) Filed: Sep. 30, 2020

(65) Prior Publication Data

US 2021/0114576 A1    Apr. 22, 2021

(30) Foreign Application Priority Data

Oct. 17, 2019    (IN) .............................. 201941042180

(51) Int. Cl.
*B60T 17/08*    (2006.01)
*B60T 15/02*    (2006.01)
(Continued)

(52) U.S. Cl.
CPC .......... *B60T 17/083* (2013.01); *B60T 13/261* (2013.01); *B60T 15/027* (2013.01); *B60T 15/043* (2013.01); *B60T 15/12* (2013.01); *B60T 17/008* (2013.01)

(58) Field of Classification Search
CPC .... B60T 17/008; B60T 17/083; B60T 17/085; B60T 15/027; B60T 13/261
(Continued)

(56) References Cited

U.S. PATENT DOCUMENTS 5,671,654 A * 9/1997 Plantan ................. B60T 17/083
285/179
6,079,312 A * 6/2000 Plantan ................. B60T 17/083
91/523
(Continued)

FOREIGN PATENT DOCUMENTS

EP    1275570 A2 *  1/2003    ............ B60T 13/683
GB    1155173 A    6/1969
(Continued)

*Primary Examiner* — Thomas J Williams
(74) *Attorney, Agent, or Firm* — Dickinson Wright PLLC

(57) ABSTRACT

A spring brake actuator has a service brake with a service brake housing and a service brake working chamber located in the service brake housing. The service brake working chamber is confined by a diaphragm. A service brake piston movable along an actuator-longitudinal axis and abuts the diaphragm, which applies a brake force onto the service brake piston. A spring between the service brake piston and the service brake housing pushes the service brake piston against the direction of the brake force. A modulator valve unit communicates with the service brake working chamber and is configured to regulate the inlet and outlet of fluid into and out of the service brake working chamber. The modulator valve unit is integrated into the spring brake actuator and includes a controllable inlet valve communicating with the service brake working chamber and a controllable outlet valve communicating with the service brake working chamber.

14 Claims, 8 Drawing Sheets

(51) Int. Cl.
*B60T 13/26* (2006.01)
*B60T 17/00* (2006.01)
*B60T 15/12* (2006.01)
*B60T 15/04* (2006.01)

(58) Field of Classification Search
USPC ........................................................ 303/9.76
See application file for complete search history.

(56) References Cited

U.S. PATENT DOCUMENTS

| | | | | |
|---|---|---|---|---|
| 6,234,587 | B1 * | 5/2001 | Gerum ................. | B60T 8/3675 |
| | | | | 303/119.2 |
| 6,264,291 | B1 * | 7/2001 | Eberling ............... | B60T 17/083 |
| | | | | 188/170 |
| 6,290,309 | B1 * | 9/2001 | Korn ....................... | B60T 17/18 |
| | | | | 188/170 |
| 6,923,509 | B1 * | 8/2005 | Barnett .................. | B60R 25/08 |
| | | | | 188/170 |
| 2007/0158146 | A1 | 7/2007 | Potter et al. | |

FOREIGN PATENT DOCUMENTS

| | | | |
|---|---|---|---|
| GN | 104245452 | A | 12/2014 |
| WO | 2012164587 | A2 | 12/2012 |

\* cited by examiner

SPRING BRAKE ACTUATOR WITH AN INTEGRATED VALVE UNIT

TECHNICAL FIELD

The present invention relates to a spring brake actuator for use in a commercial vehicle, the actuator comprising a service brake, the service brake comprising a service brake housing, a service brake working chamber located in the service brake housing, the service brake working chamber being confined by a diaphragm, a service brake piston being movable along an actuator-longitudinal axis and abutting the diaphragm, the diaphragm applying a brake force onto the service brake piston as a function of pressure inside the service brake working chamber, and a spring located between the service brake piston and the service brake housing, the spring being effective to push the service brake piston against the direction of the brake force.

BACKGROUND

Spring brake actuators of the aforementioned type are known from the prior art and are frequently implemented in commercial vehicles to generate brake forces that are applied to the vehicle wheels.

Regularly, a valve, such as a modulator valve or an anti-compounding valve, is arranged in between the foot pedal of a vehicle and the spring brake actuator to regulate the fluid pressure applied to the service brake and/or the spring brake.

A modulator valve is utilized to provide an anti-lock braking functionality which prevents the vehicle wheels from locking up during braking, thereby maintaining tractive contact with the road surface. To achieve this, the fluid pressure in the working chamber of the service brake is reduced when a wheel lock is detected.

An anti-compounding valve, on the other hand, is regularly used to ensure that whenever the service brake and the parking brake are applied simultaneously, braking forces would not add up as this may result in damages to brake components and may even lead to brake failure.

In the prior art, these kinds of valves are typically positioned at locations distant from the spring brake actuator. Due to this, pressure lines of considerable lengths are frequently required which might delay the regulation of the fluid pressure by the valves, especially if a compressible fluid, like air, is utilized to pressurize the brake. This increases the control effort required to compensate for this effect. Additionally, the mentioned configuration leads to a complex assembly.

From U.S. Pat. No. 6,264,291 B1 a spring brake actuator is known which comprises an anti-compounding check valve integrally located in a spring brake chamber. Locating such a valve in a spring brake chamber has been found to be disadvantageously with regard to maintenance and accessibility of the valve.

SUMMARY

The present disclosure describes a spring brake actuator of the initially mentioned type which overcomes the aforementioned problems as much as possible. In particular, it was an object of the invention to provide an improved spring brake actuator that provides the same or better anti-lock performance or anti-compounding performance while at the same time being as cost-efficient or more cost-efficient to assemble and maintain. In the least, it was an object of the invention to provide an alternative spring brake actuator.

In particular, the actuator comprises a modulator valve unit that is in fluid communication with the service brake working chamber and is configured to regulate the inlet and outlet of fluid into and out of the service brake working chamber, wherein the modulator valve unit comprises a controllable inlet valve being in fluid communication with the service brake working chamber and a controllable outlet valve being in fluid communication with the service brake working chamber and wherein the modulator valve unit is integrated into the spring brake actuator.

Thereby, it is assured that the assembly effort is reduced substantially. Instead of the two components—spring brake actuator and modulator valve—only one integrated component per wheel needs to be assembled to the vehicle. Furthermore, by integrating the modulator valve into the spring brake actuator, it is ensured that the units are optimized relative to one another and that the relevant operation parameters remain constant, no matter where the device is installed. Also, fast response times due to the short distance between the modulator valve and the brake are achieved. Furthermore, the overall dimensions and the total weight of the component can be reduced, compared to stand-alone solutions. As the components of the modulator valve are integrated into a discrete unit, accessibility and maintenance and exchangeability of the unit is enhanced.

With the help of the valves, the fluid pressure in the service brake working chamber can be controlled as required. For instance, the fluid pressure in the service brake working chamber may be reduced in case a wheel lock is detected by opening the outlet valve and closing the inlet valve. Opening the inlet valve and closing the outlet valve, for example, allows for uninfluenced service brake operation.

According to a preferred embodiment, the modulator valve unit is arranged adjacent to the service brake working chamber of the service brake. Arranging the modulator valve unit adjacent to the service brake reduces the required lengths of internal pressure ducts and allows for fast response times of the brake with respect to modulator valve inputs.

It is furthermore preferred that the modulator valve unit extends radially outwards with respect to the actuator-longitudinal axis, which is beneficial regarding installation space requirements.

According to a preferred embodiment, the housing of the modulator valve unit is formed integrally with the actuator housing. This further pursues the integration approach according to the invention.

In a preferred embodiment, the inlet valve is connected to the service brake working chamber by a pressure inlet duct and the outlet valve is connected to the service brake working chamber by a separate pressure outlet duct. In an alternative embodiment, the inlet valve and the outlet valve are connected to the service brake working chamber by a common pressure duct. Whether one or two pressure ducts are beneficially utilized, depends on the specific spring brake implementation. While utilizing only one duct reduces the overall unit dimensions and only one access port to the service brake working chamber is required, especially for larger spring brake actuators, due to flow considerations and fast reaction times, the use of two separate ducts can be preferable over utilizing one duct, only.

In another preferred embodiment, the inlet valve is of a normally-open type and/or the outlet valve is of a normally-closed type. This helps to ensure that the anti-lock braking functionality, if deactivated, does not influence the normal service brake operation. Fluid may proceed unobstructed into the service brake working chamber while an outlet of pressure through the outlet valve is inhibited.

It is furthermore preferred that at least one of the inlet valve or the outlet valve is a solenoid valve. Such valves are electrically actuated, fast and compact and have thus found to be beneficial for such an integrated device.

In another preferred embodiment, the spring brake actuator further comprises a silencer connected to the outlet valve for reducing noise emissions when fluid exhausts the silencer. Due to high fluid pressures involved, the outflow of fluid might generate excessive noise. To reduce such noise emissions, the use of a silencer has been found to be beneficial.

In yet another preferred embodiment, the spring brake actuator further comprises a service port connected to the inlet valve for connecting the modulator valve unit to a fluid power supply, preferably via a relay valve or a foot pedal. The service port allows for an easy to assemble and fluid-tight connection with the vehicle braking system.

According to a second aspect of the invention, the invention moreover relates to a spring brake actuator for use in a commercial vehicle, the actuator comprising a service brake and a spring brake, the spring brake comprising a spring brake working chamber, the service brake comprising a service brake working chamber, and a flange being arranged between the service brake and the spring brake.

The spring brake actuator preferably comprises an anti-compounding valve unit that is in fluid communication with the service brake working chamber and the spring brake working chamber and is configured for regulating a fluid flow into the service brake working chamber and the spring brake working chamber, wherein the valve unit is formed integrally with the flange.

Such a design helps to reduce the assembly effort. Furthermore, the overall dimensions and the total weight of the component can be reduced, compared to stand-alone solutions. Due to the positioning of the valve unit in the flange, the unit remains accessible after assembly and my easily be exchanged and/or maintained.

Both aspects of the invention share the common inventive idea of integrating components of an anti-compounding device or a modulator device into a discrete unit attached to the actuator to enhance accessibility, maintainability and exchangeability.

It is furthermore preferred that the anti-compounding valve unit comprises a service brake pressure port, a spring brake pressure port, a service brake pressure duct connecting the service brake pressure port to the service brake working chamber, a spring brake pressure duct connecting the spring brake pressure port to the spring brake working chamber, a cavity connecting the service brake pressure duct and the spring brake pressure duct, and a valve piston being movably held within the cavity, wherein the valve piston is movable between a first position at which the valve piston enables a fluid flow from service brake pressure duct to the spring brake pressure duct and blocks the spring brake pressure port, and a second position at which the valve piston blocks a fluid flow between the service brake pressure duct and the spring brake pressure duct and enables a fluid flow through the spring brake pressure duct.

This design provides an integrated solution to avoid brake-compounding by ensuring that the spring brake and the service brake are not operated simultaneously.

For example, when the vehicle is intended to be parked, the service brake is activated by providing pressurized fluid to the service brake pressure port. This pressure also moves the valve piston which in turn blocks the spring brake pressure duct and ensures that the pressure is kept within the spring brake working chamber therewith avoiding that the spring brake adds additional braking force, even when pressure is released at the spring brake pressure port. Thereby, it is avoided that whenever spring brake and service brake are operated simultaneously, also the braking forces of the two brakes add up and potentially damage brake components.

According to another preferred embodiment, the valve piston comprises a valve spring abutting a housing section of the cavity for applying a spring force upon the valve piston for moving the valve piston towards the second position. Preferably, the cavity comprises a step limiting the movement of the valve piston in the second position.

This ensures that during normal operation, both the spring brake pressure duct and the service brake pressure duct are kept in an open and well defined state.

According to yet another preferred embodiment, the valve piston comprises a basic body having a first circular grove and a second circular groove each having an O-ring fitted therein, wherein the first groove/O-ring is positioned to selectively enable or block a fluid flow from service brake pressure duct to the spring brake pressure duct and wherein the second groove/O-ring is positioned to selectively enable or block a fluid flow through the spring brake pressure duct.

This design has been found to be beneficial for avoiding that spring brake and the service brake are operated simultaneously which might result to brake component failures.

For a more complete understanding of the invention, the invention will now be described in more detail with reference to the accompanying drawings. The detailed description will illustrate and describe or is considered as a preferred embodiment of the invention. It should of course be understood that various modifications and changes in form or detail could readily be made without departing from the scope of the invention. It is therefore intended that the invention may not be limited to the exact form and detail shown and described herein. Further, any features described in the description, the drawings and the claims disclosing the invention may be considered individually or in combination. In particular, any parenthetical reference character in the claims shall not be construed as limiting the scope of the invention to the specific embodiment bearing the reference character. The word "comprising" does not exclude other elements or steps. The wording "a" or "an" does not exclude a plurality.

BRIEF DESCRIPTION OF THE DRAWINGS

In brief, the figures which reference will be to made show the following.

DETAILED DESCRIPTION OF THE DRAWINGS

Figure 1:
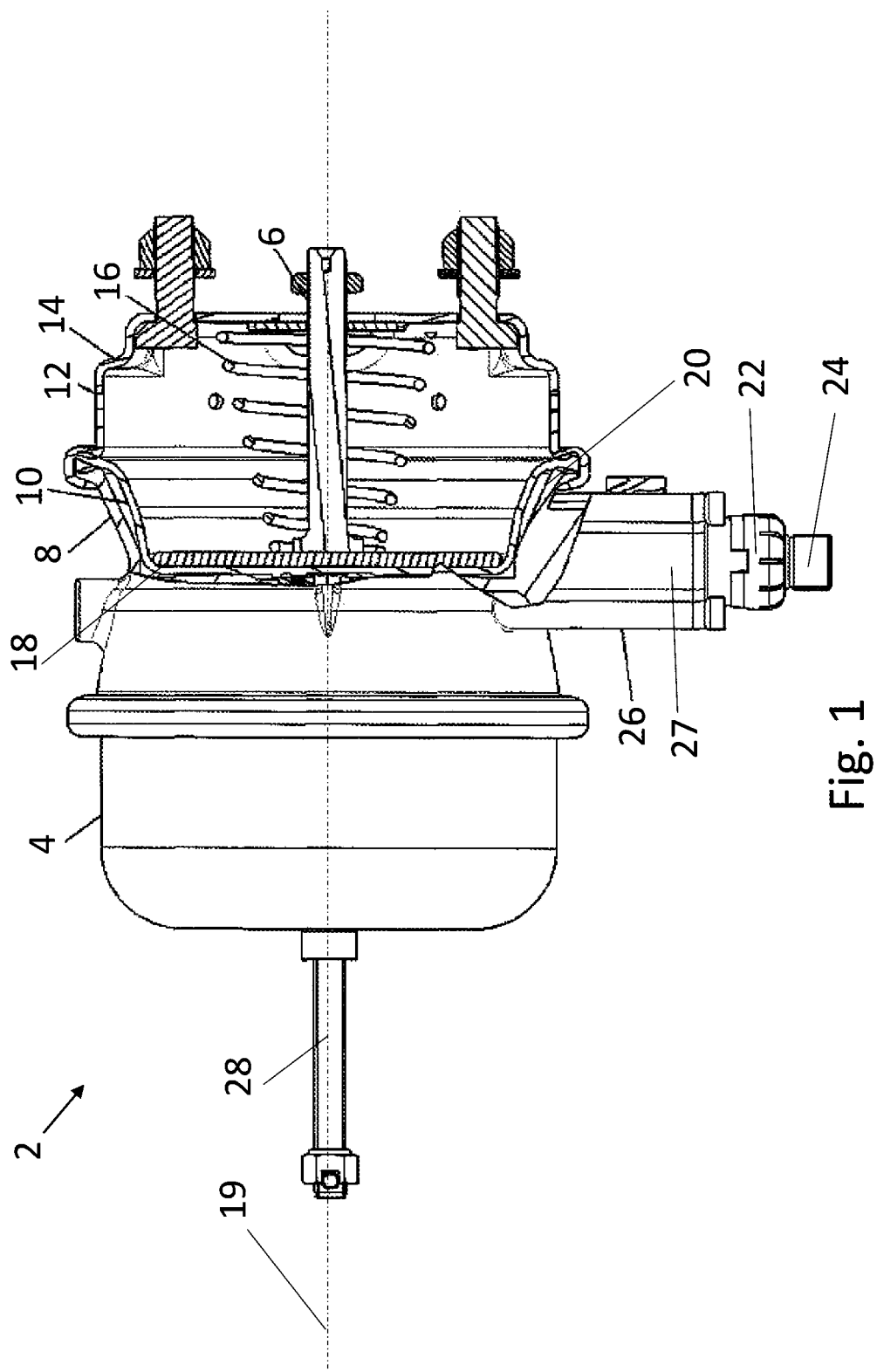
FIG. 1 shows a spring brake actuator comprising an integrated modulator valve unit according to a preferred embodiment.

FIG. 1 shows a spring brake actuator 2 comprising a spring brake 4 and a service brake 12, as well as an actuator housing 8. While the spring brake 4, which comprises a release bolt 28 for releasing the spring brake 4, provides an emergency and parking brake functionality, the service brake 12 provides brake forces during normal vehicle braking operation.

The service brake 12 comprises a service brake housing 14, in which a working chamber 20 is located. The service brake working chamber 20 is confined by a diaphragm 10. The service brake 12 furthermore comprises a service brake piston 18 having a piston rod 6. The service brake piston 18 abuts the diaphragm 10 for applying a brake force to the service brake piston 18 and the piston rod 6 as a function of pressure inside the working chamber 20. The service brake piston 18 is movable along the actuator-longitudinal axis 19. To push the service brake piston 18 against the direction of the brake force (to the left in the perspective of FIG. 1) when the pressure in the working chamber 20 decreases, a spring 16 is located in between the service brake piston 18 and the service brake housing 14.

The spring brake actuator 2 furthermore comprises a modulator valve unit 26, the function of which will be detailed with reference to FIG. 2. The modulator valve unit 26 comprises a modulator valve housing 27. The modulator valve unit 26 is integrated into the spring brake actuator 2. The modulator valve unit 26 comprises a service port 24 for connecting the modulator valve unit 26 to a fluid power supply, preferably via a relay valve or a brake foot pedal (not shown). The modulator valve unit 26 furthermore comprises a silencer 22 for reducing noise emissions when fluid exhausts the silencer 22.

Figure 2:
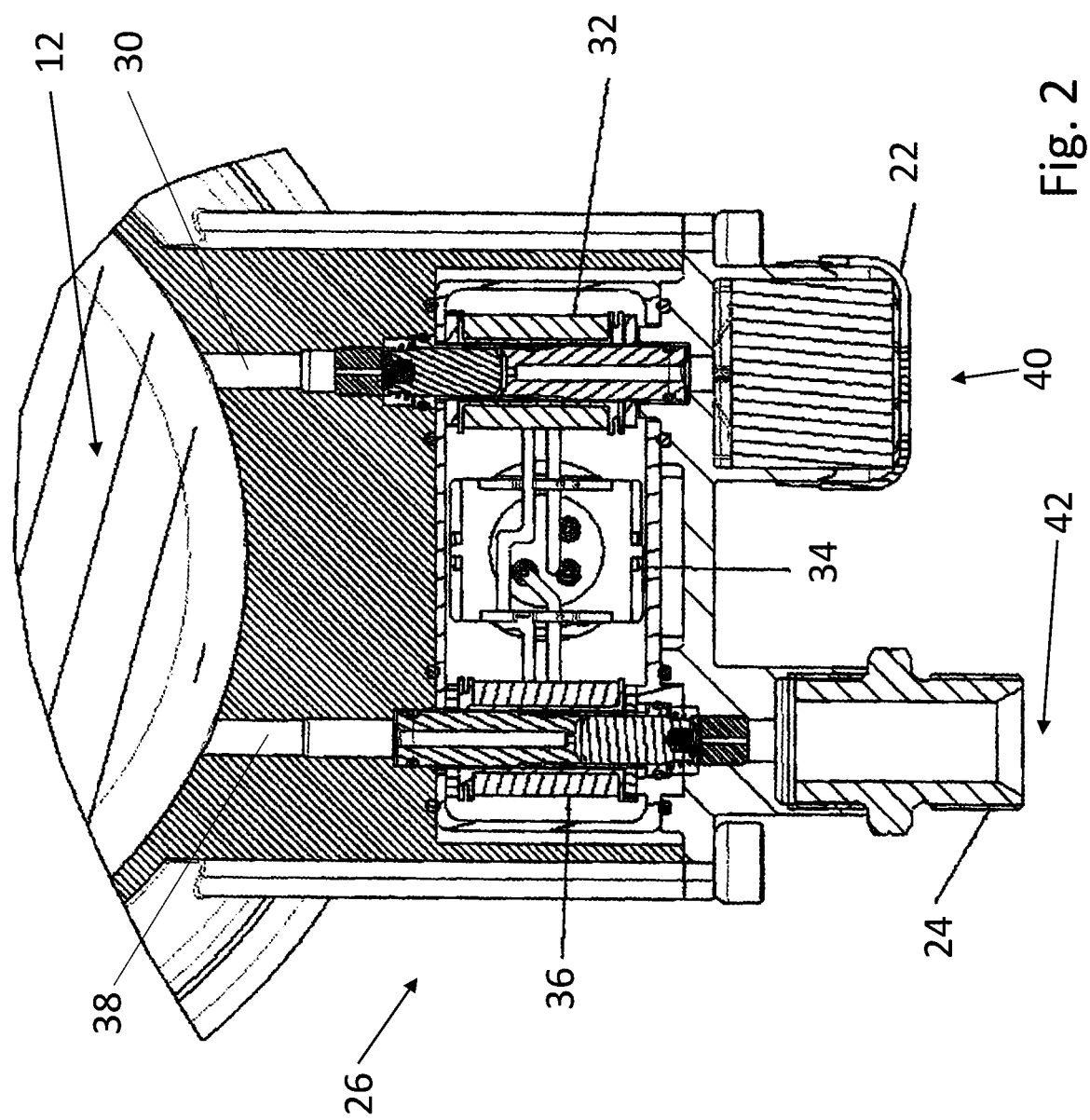
FIG. 2 shows a partial view of the spring brake actuator of FIG. 1

FIG. 2 shows a partial view of the spring brake actuator 2, especially the modulator valve unit 26. The modulator valve unit 26 comprises an inlet valve 36 being in fluid communication with the working chamber 20 and an outlet valve 32 being in fluid communication with the working chamber 20. The inlet valve 36 is connected to the working chamber 20 by a pressure inlet duct 38 and the outlet valve 32 is connected to the working chamber 20 by a separate pressure outlet duct 30.

The inlet valve 36 and the outlet valve 32 are solenoid valves 32, 36. The inlet solenoid valve 36 is of the normally-open type and the outlet solenoid valve 32 is of the normally-closed type. The inlet solenoid valve 36 and the outlet solenoid valve 32 are connected to a solenoid power circuit 34.

Furthermore, the inlet solenoid valve 36 is connected to a pressure inlet 42 comprising the service port 24. The outlet solenoid valve 32 is connected to a pressure outlet 40 comprising the silencer 22.

Figure 3:
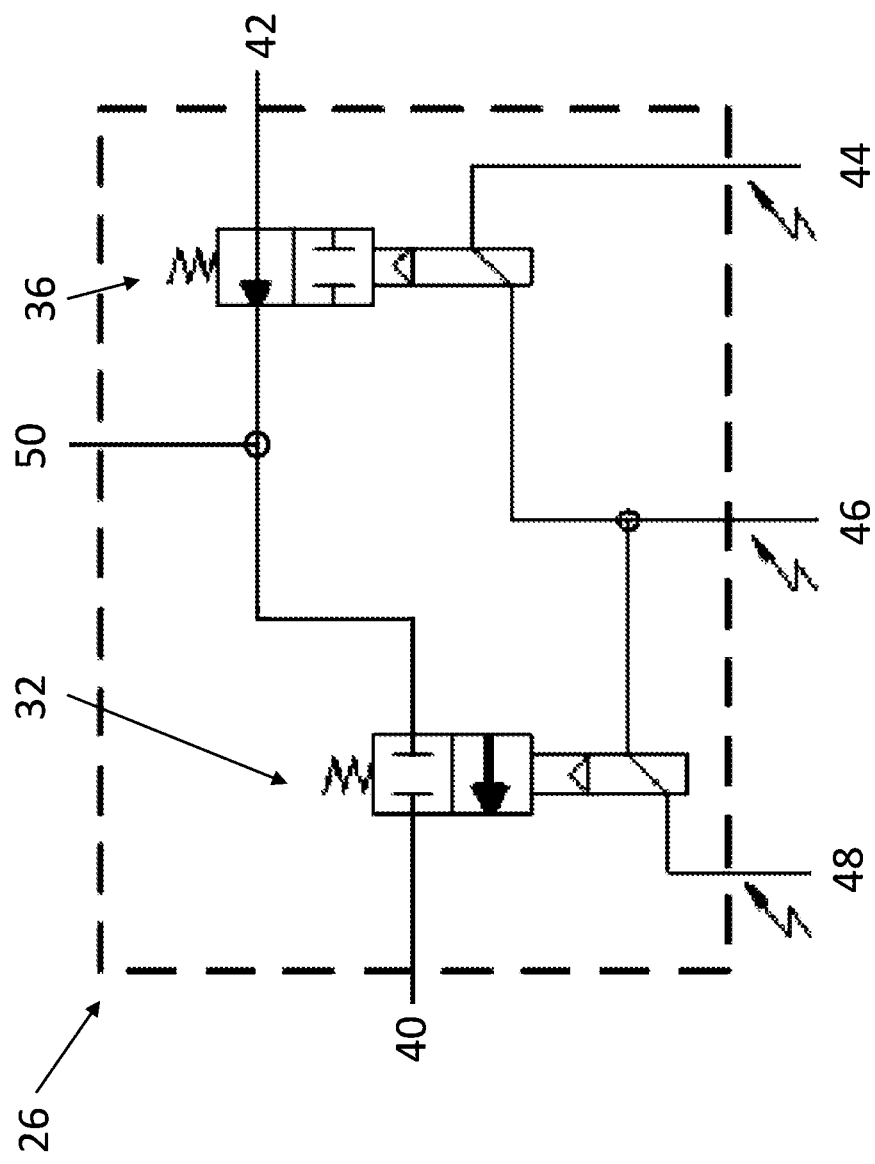
FIG. 3 shows a modulator valve unit block diagram according to the embodiment of FIGS. 1 and 2.

FIG. 3 shows the pneumatic and electric dependencies of the solenoid valves 32 and 36 within the modulator valve unit 26 with the help of a block diagram.

On the electric (lower) side, the inlet solenoid valve 36 is connected to an external or internal controller (not shown) via an inlet solenoid connection 48. The outlet solenoid valve 32 is connected to an external or internal controller (not shown) via an outlet solenoid connection 44. Both solenoid valves 32, 36 are further connectable to ground via a ground connection 46.

On the pneumatic (upper) side, pressurized fluid is provided via the pressure inlet 42. The pressure inlet 42 is connected to the inlet solenoid valve 36, which is normally-open. After passing the inlet solenoid valve 36, fluid is guided via a common pressure duct 50 or two separate pressure ducts 30, 38 (not shown, see FIG. 2) to the working chamber 20 (see FIG. 1). The pressure duct 50 is furthermore connected to the outlet solenoid valve 32, which is normally-closed. From there, fluid is guided towards the pressure outlet 40.

With the help of the solenoid valves 32 and 36, the anti-lock braking functionality is realized. For instance is the fluid pressure in the working chamber 20 reduced, in case a wheel lock is detected, by opening the outlet solenoid valve 32 and closing the inlet solenoid valve 36. Without applying electrical power, the inlet solenoid valve 36 is open and the outlet solenoid valve 32 is closed, so that service brake operation is not influenced by the modulator valve unit 26 in this case.

Figure 4:
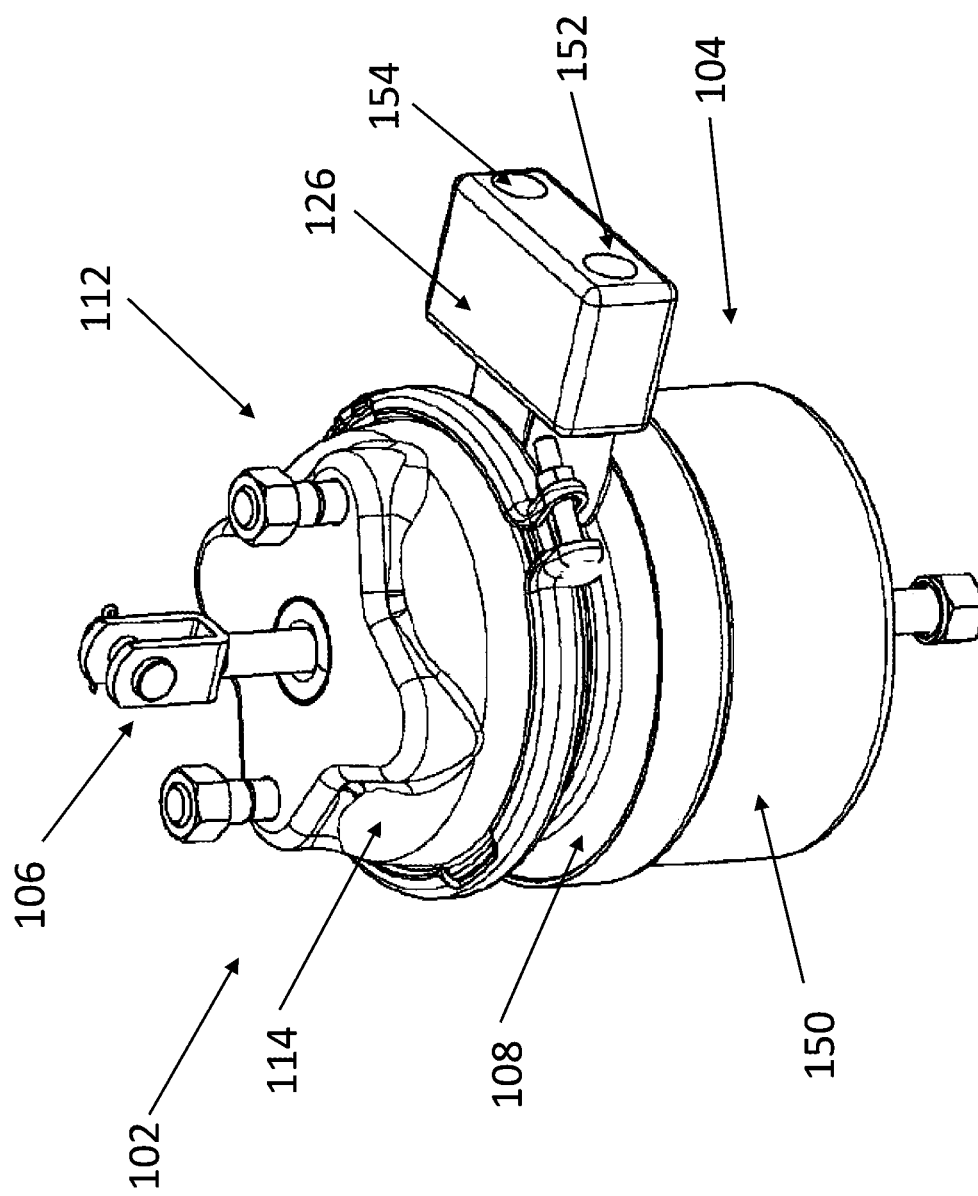
FIG. 4 shows a perspective view of an alternative embodiment of a spring brake actuator comprising an integrated anti-compounding valve.

FIG. 4 shows a perspective view of an alternative embodiment of a spring brake actuator 102. The spring brake actuator 102 comprises a spring brake 104 and a service brake 112. The service brake 112 comprises a service brake housing 114 and is configured to apply a braking force upon a piston rod 106 in the way already described with respect to the first embodiment shown in FIGS. 1 to 3. The spring brake 104 furthermore comprises a spring brake housing 150.

A flange 108 is arranged between the service brake 112 and the spring brake 104. An anti-compounding valve unit 126 is formed integrally with the flange 108. The valve unit 126 comprises a service brake pressure port 152 and a spring brake pressure port 154. These ports 152, 154 are connected via the valve unit 126 to a service brake working chamber 120 and a spring brake working chamber 122 (not shown in FIG. 4) as will be apparent based on FIGS. 6a and 6b.

Figure 5:
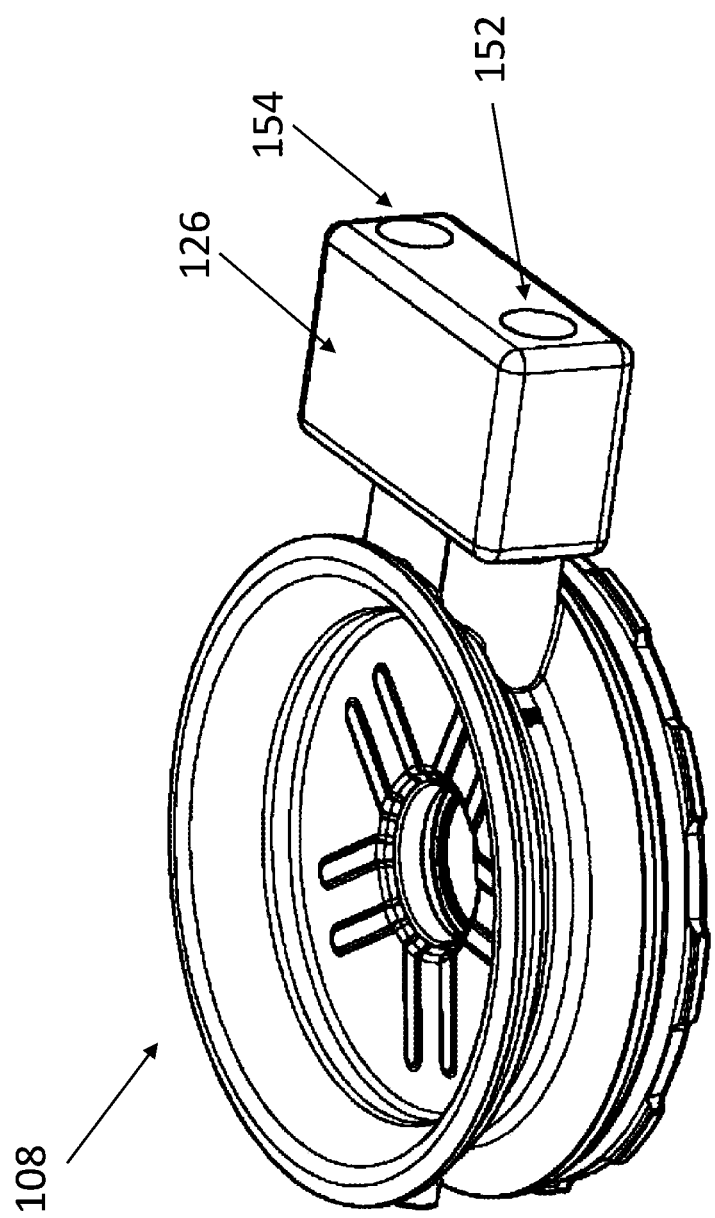
FIG. 5 shows a perspective view of a flange of the actuator according to FIG. 4, FIGS. 6a, 6b show partial views of the actuator according to FIGS. 4 and 5 in different modes of operation.

FIG. 5 shows a perspective view of the flange 108 having the anti-compounding valve unit 126 formed integrally therewith. As described with reference to FIG. 4, the valve unit 126 comprises the service brake pressure port 152 and the spring brake pressure port 154.

Figure 6A:
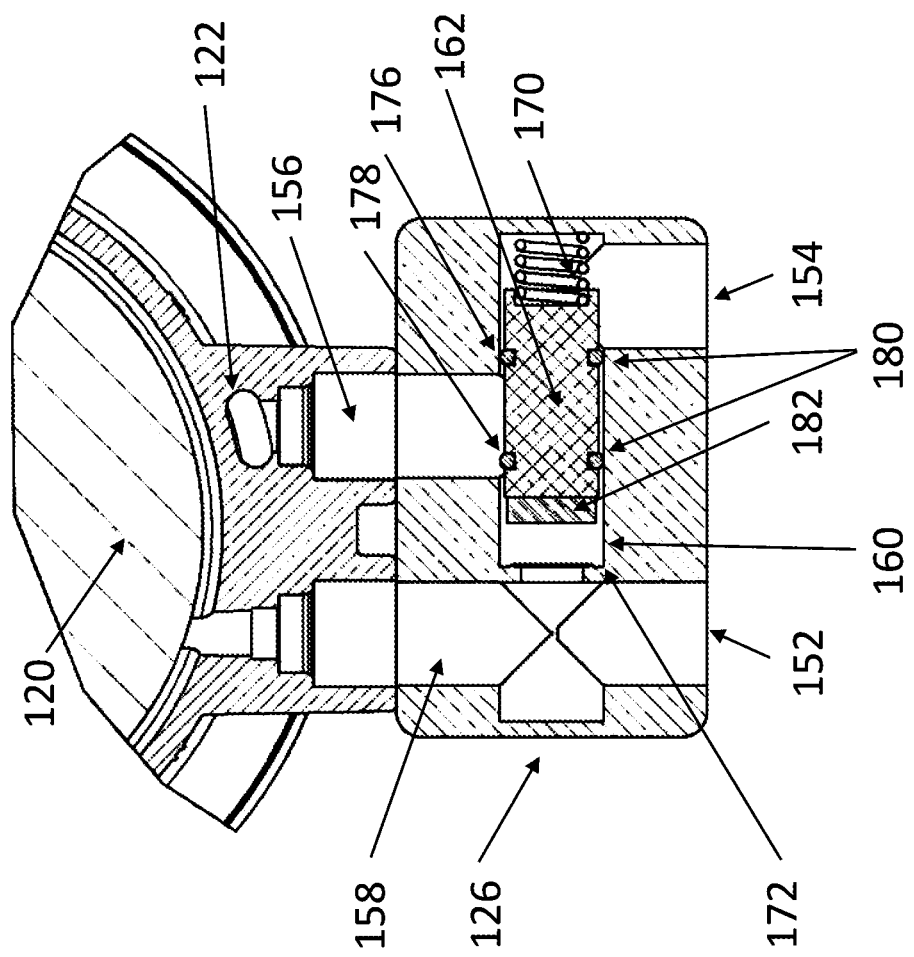
Figure 6B:
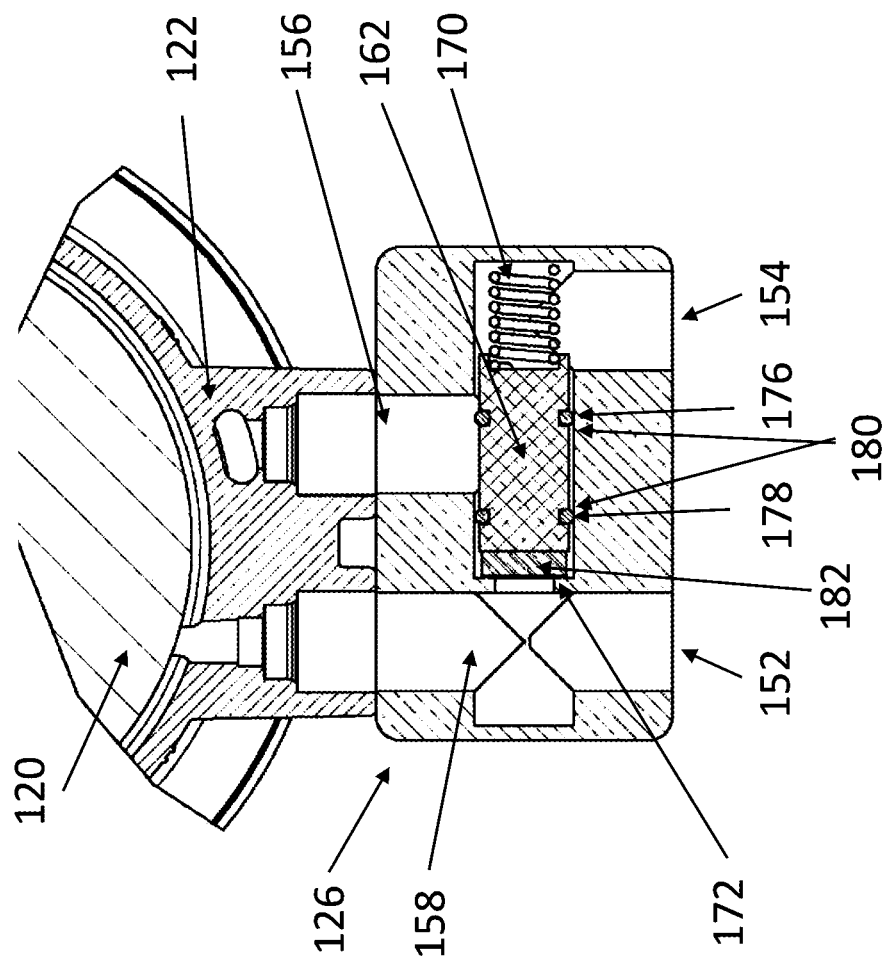

FIGS. 6a and 6b show partial views of the spring brake actuator 102 in different modes of operation. According to FIG. 6a, the anti-compounding valve unit 126 comprises the service brake pressure port 152 and the spring brake pressure port 154. The valve unit 126 moreover comprises a service brake pressure duct 158 connecting the service brake pressure port 152 to a service brake working chamber 120 and a spring brake pressure duct 156 connecting the spring brake pressure port 154 to a spring brake working chamber 122.

Furthermore, a cavity 160 connects the service brake pressure duct 158 to the spring brake pressure duct 156. A valve piston 162 is movably held within the cavity 160.

The valve piston 162 is movable between a first position shown in FIG. 6a, at which the valve piston 162 enables a fluid flow from service brake pressure duct 158 to the spring brake pressure duct 156 and blocks the spring brake pressure port 154, and a second position shown in FIG. 6b, at which the valve piston 162 blocks a fluid flow between the service brake pressure duct 158 and the spring brake pressure duct 156 and enables a fluid flow through the spring brake pressure duct 156.

The valve piston 162 comprises a valve spring 170 abutting a housing section of the cavity 160 for applying a spring force upon the valve piston 162 for moving the valve piston 162 towards the second position shown in FIG. 6b. The cavity 160 comprises a step 172 limiting the movement of the valve piston 162 in the second position.

With the help of the valve spring 170, during normal operation, the spring brake pressure duct 156 is kept open so that pressurized fluid can be applied to and released from the spring brake working chamber 122 keeping the spring brake 104 open or closed.

The valve piston 162 comprises a basic body 174 (see FIG. 7) having a first circular grove 176 and a second circular groove 178 each having an O-ring 180 fitted therein. The second groove 178/O-ring 180 is positioned to selectively enable or block a fluid flow from service brake pressure duct 158 to the spring brake pressure duct 156, wherein the first groove 176/O-ring 180 is positioned to selectively enable or block a fluid flow through the spring brake pressure duct 156.

When the vehicle is intended to be parked, the service brake 112 is activated by providing pressurized fluid to the service brake pressure port 152. This pressure moves the valve piston 162 against the force of the spring 170 to the right (as shown in FIG. 6a). This blocks the spring brake pressure duct 156 and ensures that the pressure is kept within the spring brake working chamber 122 thereby avoiding that the spring brake 104 closes and adds additional braking force, even when pressure is released at the spring brake pressure port 154. When the service brake 112 is released, the valve piston 162 moves to the left, thereby reopening the spring brake pressure duct 156 (as shown in FIG. 6b). Pressurized fluid may now exhaust out of the spring brake pressure port 154 which, in turn, closes the spring brake 104. Thereby, it is avoided that whenever spring brake 104 and service brake 112 are operated simultaneously, also the braking forces of the two brakes 104, 112 add up and potentially damage brake components.

When the vehicle is intended to be moved again after parking, pressure is applied to the service brake 112 via service brake pressure port 152, thereby moving the valve piston 162 against the force of the spring 170 to the right as shown in FIG. 6a. The valve piston 162 connects the service brake pressure duct 158 to the spring brake pressure duct 156. With that, also the spring brake working chamber 122 gets pressurized thus opening the spring brake 104 while again ensuring that an overloading of the brake components is avoided.

Figure 7:
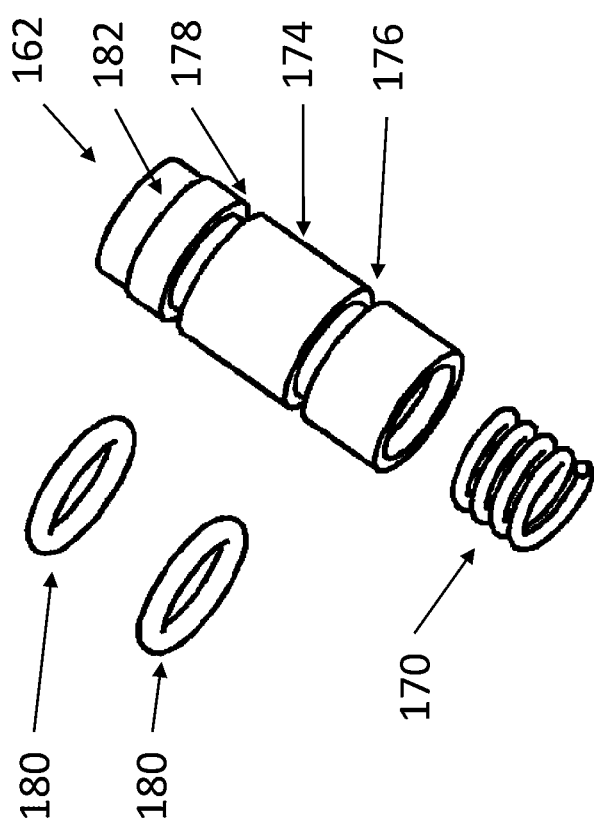
FIG. 7 shows an explosive view of a piston of the actuator according to FIGS. 4 to 6.

Finally, FIG. 7 shows an explosive view of the valve piston 162 of the spring brake actuator 102. The valve piston 162 comprises a basic body 174 having circular grooves 176, 178 therein. O-rings 180 are attached to the grooves 176, 178. Furthermore, a rubber cap 182 is attached to the basic body 174. The valve piston 162 moreover comprises the spring 170.

LIST OF REFERENCE NUMBERS (PART OF THE DESCRIPTION)

2 spring brake actuator
4 spring brake
6 piston rod
8 actuator housing
10 diaphragm
12 service brake
14 service brake housing
16 spring
18 service brake piston
19 actuator-longitudinal axis
20 service brake working chamber
22 silencer
24 service port
26 modulator valve unit
27 modulator valve housing
28 release bolt
30 pressure outlet duct
32 outlet solenoid valve
34 solenoid power circuit
36 inlet solenoid valve
38 pressure inlet duct
40 pressure outlet
42 pressure inlet
44 outlet solenoid connection
46 ground connection
48 inlet solenoid connection
50 common pressure duct
102 spring brake actuator
104 spring brake
106 piston rod
108 flange
112 service brake
114 service brake housing
120 service brake working chamber
122 spring brake working chamber
126 anti-compounding valve unit
150 spring brake housing
152 service brake pressure port
154 spring brake pressure port
156 spring brake pressure duct
158 service brake pressure duct
160 cavity
162 valve piston
170 valve spring
172 step
174 piston basic body
176 first circular grove
178 second circular groove
180 O-ring
182 rubber cap

The invention claimed is:

1. A spring brake actuator (2) for use in a commercial vehicle, the spring brake actuator (2) comprising a service brake (12), the service brake (12) comprising:
 a service brake housing (14),
 a service brake working chamber (20) located in the service brake housing (14), the service brake working chamber (20) being confined by a diaphragm (10),
 a service brake piston (18) being movable along an actuator-longitudinal axis (19) and abutting the diaphragm (10), the diaphragm (10) applying a brake force onto the service brake piston (18) as a function of pressure inside the service brake working chamber (20),
 a spring (16) located between the service brake piston (18) and the service brake housing (14), the spring (16) being effective to push the service brake piston (18) against the brake force,
 wherein the spring brake actuator (2) comprises a modulator valve unit (26) that is in fluid communication with the service brake working chamber (20) and is configured to regulate the inlet and outlet of fluid into and out of the service brake working chamber (20),
 wherein the modulator valve unit (26) comprises a controllable inlet valve (36) being in fluid communication with the service brake working chamber (20) and a controllable outlet valve (32) being in fluid communication with the service brake working chamber (20) and wherein the modulator valve unit (26) is integrated into the spring brake actuator (2);

wherein a housing (27) of the modulator valve unit (26) is formed integrally with an actuator housing (8);

wherein the inlet valve (36) is connected to the service brake working chamber (20) by a pressure inlet duct (38) and the outlet valve (32) is connected to the service brake working chamber (20) by a separate pressure outlet duct (30).

2. The spring brake actuator (2) according to claim 1, wherein the modulator valve unit (26) is arranged adjacent to the service brake working chamber (20) of the service brake (12).

3. The spring brake actuator (2) according to claim 1, wherein the modulator valve unit (26) extends radially outwards with respect to the actuator-longitudinal axis (19).

4. The spring brake actuator (2) according to claim 1, wherein at least one of the inlet valve (36) and the outlet valve (32) is a solenoid valve (32, 36).

5. The spring brake actuator (2) according to claim 1, further comprising a silencer (22) connected to the outlet valve (32) for reducing noise emissions.

6. The spring brake actuator (2) according to claim 1, further comprising a service port (24) connected to the inlet valve (36) for connecting the modulator valve unit (26) to a fluid power supply.

7. The spring brake actuator (2) according to claim 6, wherein the modulator valve unit (26) is connected to the fluid power supply via a relay valve.

8. The spring brake actuator (2) according to claim 6, wherein the modulator valve unit (26) is connected to the fluid power supply via a foot pedal.

9. A spring brake actuator (2) for use in a commercial vehicle, the spring brake actuator (2) comprising a service brake (12), the service brake (12) comprising:
a service brake housing (14),
a service brake working chamber (20) located in the service brake housing (14), the service brake working chamber (20) being confined by a diaphragm (10),
a service brake piston (18) being movable along an actuator-longitudinal axis (19) and abutting the diaphragm (10), the diaphragm (10) applying a brake force onto the service brake piston (18) as a function of pressure inside the service brake working chamber (20),
a spring (16) located between the service brake piston (18) and the service brake housing (14), the spring (16) being effective to push the service brake piston (18) against the brake force,
wherein the spring brake actuator (2) comprises a modulator valve unit (26) that is in fluid communication with the service brake working chamber (20) and is configured to regulate the inlet and outlet of fluid into and out of the service brake working chamber (20),
wherein the modulator valve unit (26) comprises a controllable inlet valve (36) being in fluid communication with the service brake working chamber (20) and a controllable outlet valve (32) being in fluid communication with the service brake working chamber (20) and wherein the modulator valve unit (26) is integrated into the spring brake actuator (2);
wherein a housing (27) of the modulator valve unit (26) is formed integrally with an actuator housing (8);
wherein the inlet valve (36) is a normally open valve and the outlet valve (32) is a normally closed valve.

10. The spring brake actuator (2) according to claim 9, wherein the inlet valve (36) and the outlet valve (32) are connected to the service brake working chamber (20) by a common pressure duct (50).

11. A spring brake actuator (102) for use in a commercial vehicle, the spring brake actuator (102) comprising:
a spring brake (104) having a spring brake working chamber (122);
a service brake (112) having a service brake working chamber (120) and a flange (108) arranged between the service brake (112) and the spring brake (104); and
an anti-compounding valve unit (126) in fluid communication with the service brake working chamber (120) and the spring brake working chamber (122) and configured for regulating a fluid flow into the service brake working chamber (120) and the spring brake working chamber (122);
wherein the valve unit (126) is formed integrally with the flange (108);
wherein the anti-compounding valve unit (126) comprises:
a service brake pressure port (152),
a spring brake pressure port (154),
a service brake pressure duct (156) connecting the service brake pressure port (152) to the service brake working chamber (120),
a spring brake pressure duct (156) connecting the spring brake pressure port (152) to the spring brake working chamber (122),
a cavity (160) connecting the service brake pressure duct (158) and the spring brake pressure duct (156); and
a valve piston (162) being movably held within the cavity (160),
wherein the valve piston (162) is movable between a first position, in which the valve piston (162) enables a fluid flow from service brake pressure duct (158) to the spring brake pressure duct (156) and blocks the spring brake pressure port (154), and a second position, in which the valve piston (162) blocks a fluid flow between the service brake pressure duct (158) and the spring brake pressure duct (156) and enables a fluid flow through the spring brake pressure duct (156).

12. The spring brake actuator (102) according to claim 11, wherein the valve piston (162) comprises a valve spring (170) abutting a housing section of the cavity (160) for applying a spring force upon the valve piston (162) for moving the valve piston (162) towards the second position.

13. The spring brake actuator (102) according to claim 11, wherein the cavity (160) comprises a step (172) limiting the movement of the valve piston (162) in the second position.

14. The spring brake actuator (102) according to claim 13, wherein the valve piston (162) comprises a basic body (174) having a first circular grove (176) and a second circular groove (178) each having an O-ring (180) fitted therein, wherein the first groove (176)/O-ring (180) is positioned to selectively enable or block a fluid flow from service brake pressure duct (158) to the spring brake pressure duct (156) and wherein the second groove (178)/O-ring (180) is positioned to selectively enable or block a fluid flow through the spring brake pressure duct (158).

* * * * *